UNITED STATES PATENT OFFICE.

CHARLES H. PHILLIPS, OF NEW YORK, N. Y.

IMPROVEMENT IN MANUFACTURING MILK OF MAGNESIA.

Specification forming part of Letters Patent No. 159,446, dated February 2, 1875; application filed August 21, 1874.

*To all whom it may concern:*

Be it known that I, CHARLES H. PHILLIPS, of New York, in the county of New York and State of New York, have invented certain new and useful Improvements in the Process of Manufacturing Milk of Magnesia; and I do hereby declare that the following is a full, clear, and exact description thereof, which will enable others skilled in the art to which it pertains to make and use the same.

My invention relates to a new and improved mode of making the medical compound termed "milk of magnesia," which was patented to Charles H. Phillips and Lawrence Reid on the 29th day of April, 1873, and which compound consists of a pure hydrate of the oxide of magnesium suspended in water.

As previously prepared, great difficulty was experienced in making it, so as to get it absolutely free from the remnants of the sulphates of the alkalies used in precipitating resultant sulphate or chloride of the caustic soda or potash used in said patented process for precipitating chloride to its desired form as a hydrate in a pure state.

To facilitate this process is the object of my present improvement; and it consists in resolving the magnesia from its state as a sulphate or other soluble salt of magnesia to a hydrate by the aid of ammonia, preferably liquor ammonia.

To enable others skilled in the art to prepare the milk of magnesia by this process, I will now proceed to describe it.

To make one hundred gallons of the milk of magnesia, one hundred and twenty-five pounds of the pure sulphate of magnesia is taken and dissolved in about two hundred gallons of distilled water, filtering it through paper, if either necessary or desirable. To this is then added sufficient liquor of ammonia to free and precipitate the magnesia from the sulphuric acid with which it is combined. For this purpose from thirty to eighty pounds of the liquor of ammonia, according to the strength of the preparation, are requisite to produce the desired result. Where liquor ammonia fortior, containing some twenty-six and one-half per cent. of ammonia, is used, from thirty to forty pounds will be found amply sufficient for the purpose; but where simple liquor ammonia is used, containing about ten and a half per cent. of ammonia, it will take from two to three times as many pounds to produce the same result. In each case, however, sufficient should be used to insure the thorough precipitation of the magnesia, and for this purpose it is better to dilute it with a sufficiency of water, to prevent evaporation before combining with the sulphuric acid of the magnesia.

The materials above mentioned, having been thoroughly mixed and incorporated with each other, may or may not be subjected to heat, as, for instance, through the aid of steam, in the manner employed and described in the patent above referred to. In either event, however, sufficient agitation must be employed to prevent the coagulation of the magnesia on the bottom and sides of the vessel used. This done, the solution and mixture are allowed to settle for such time as may be necessary for the purpose; but, as a rule, twenty-four hours or thereabout will be found amply sufficient. The clear liquor containing a portion of the resultant sulphate of ammonia is then drawn off, and more distilled water added, in quantity sufficient to replace the liquor withdrawn, and the mass agitated for ten minutes to half an hour, and again allowed to settle. It is then drawn off as before. This operation may be repeated for three or four times more, when it will be found sufficiently pure for the purpose desired.

The sulphate of ammonia being much more easily removed by washing than the resultant solutions of the sulphates of soda and potash of the aforesaid patented process, materially lessens the time, labor, and expense of the process. Or, instead of simply using cold water for the washing process, heat with agitation may be employed, either in the form of steam, or in any other suitable form, in which case the boiling may be sufficiently prolonged during one or two washings to entirely expel the sulphate of ammonia, thereby leaving nothing behind but the hydrate of magnesia in its pure form suspended in the water; but if desired, it may be washed once or twice more to insure the utmost purity of the product.

When the ammonia is driven off by boiling directly from the magnesia after the reaction has taken place, the vat or boiler in which the mixture is contained should be provided with a suitable cover and worm through which the products of distillation may be conducted into the receiver into which the ammonia is to be reclaimed. The boiling need not continue longer than is absolutely necessary to expel the ammonia.

The sulphate and excess of other kinds of ammonia thus driven off may be condensed in any known way, and afterward treated with soda or other suitable material to set free the ammoniacal gas, and, which being again condensed in water, will form the necessary liquor ammoniæ for the next vatful of magnesia to be reduced to the state of a hydrate; thus the same ammonia may be used over and over again, but little additional fresh ammonia being required for each new vatful of the magnesian solution; and the same course may be pursued with the mother-liquor when drawn off—that is to say, where boiling is not resorted to as the means of expelling the resultant sulphate or muriate of ammonia from the aqueous mixture of the hydrate of magnesia formed by the process first described; or it may be effected in any other way known to manufacturers of ammonia and its combinations. The pure hydrate of magnesia thus obtained is then mixed with the necessary amount of pure distilled water to make it of the consistency required, and which is termed "milk of magnesia," each one hundred and twenty-five pounds of the sulphate yielding about one hundred gallons of milk of magnesia of the consistency required, or about twenty grains of the pure hydrate to every fluid ounce of the so-called milk of magnesia; but it may be charged with more or less, as required, by simply increasing or diminishing the quantity of water with which it is mixed.

If absolute purity of the hydrate is required, the process of washing the magnesia may be repeated as often as may be deemed necessary; but for all practical purposes, where heat is applied, two or three washings will be found abundantly sufficient to remove any reasonable amount of excess of the ammonia used for the precipitation of the hydrate of magnesia, or the removal of its resultant sulphate.

Instead of using the sulphate of magnesia as the source of procuring the hydrate, any other pure soluble salt of magnesia may be used, such as the chloride of magnesium, simply using a sufficiency of the ammonia above referred to to effect the necessary chemical change, the resultant mixture being treated in precisely the same manner as before, the only difference where the chloride is used being the formation of a hydrate of magnesia, and a muriate instead of a sulphate of ammonia; but the sulphate of magnesia is preferred, as there is a more abundant source of the raw material than there is of the other.

Having described my invention, what I claim is—

The process herein described of preparing the hydrate of magnesia, termed milk of magnesia, to wit, by subjecting a soluble salt of magnesia to the action of ammonia, in the manner substantially as set forth.

In testimony that I claim the foregoing as my own I affix my signature in presence of two witnesses.

CHAS. H. PHILLIPS.

Witnesses:
C. E. H. PHILLIPS,
W. J. HARRIS.